Figures 1, 2, 3:
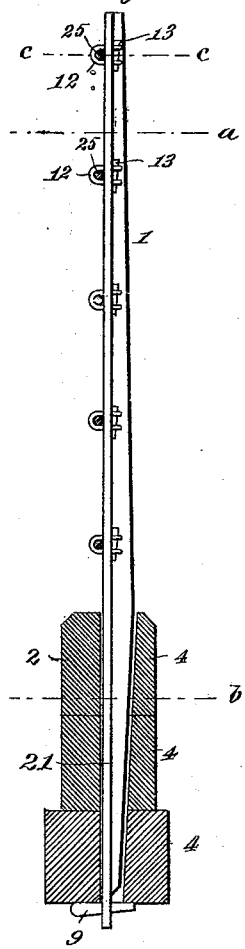

(No Model.) 2 Sheets—Sheet 1.
F. L. FAIRCHILD.
FENCE POST.
No. 356,995. Patented Feb. 1, 1887.
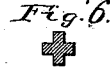   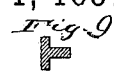
Fig. 6. Fig. 7. Fig. 8. Fig. 9.
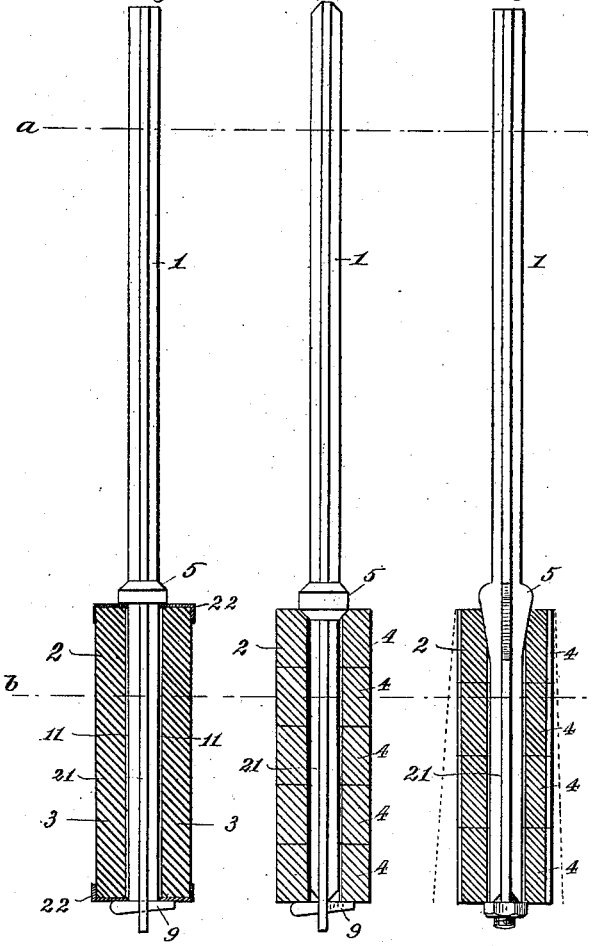
Fig. 4.
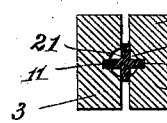 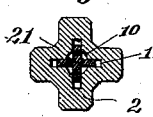  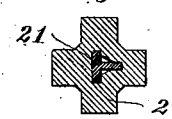
Fig. 10. Fig. 11. Fig. 12. Fig. 13.
Witnesses:
N. N. Low
E. A. Dick
Inventor:
Frank L. Fairchild
by Marcellus Bailey
his attorney (No Model.)
F. L. FAIRCHILD.
FENCE POST.
No. 356,995.    Patented Feb. 1, 1887.
2 Sheets—Sheet 2.
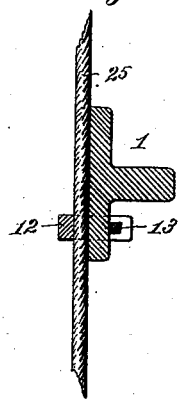
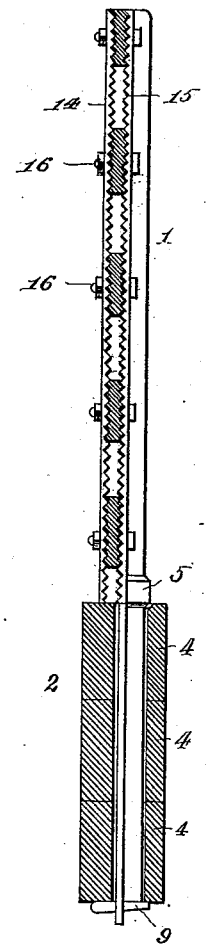
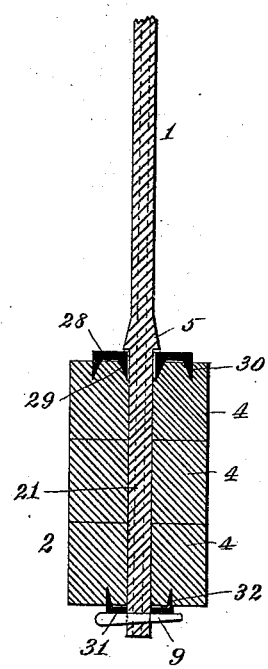
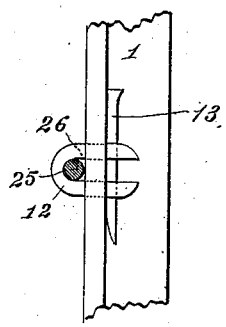
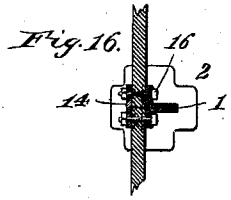
Witnesses:
H. N. Low
E. A. Dick
Inventor:
Frank L. Fairchild
by Marcellus Bailey
his attorney

UNITED STATES PATENT OFFICE.

FRANK L. FAIRCHILD, OF MOUNT VERNON, OHIO.

FENCE-POST.

SPECIFICATION forming part of Letters Patent No. 356,995, dated February 1, 1887.

Application filed November 27, 1885. Serial No. 184,042. (No model.)

*To all whom it may concern:*

Be it known that I, FRANK L. FAIRCHILD, of Mount Vernon, Knox county, in the State of Ohio, have invented certain new and useful Improvements in Fence-Posts and Bases therefor, of which the following is a specification.

My invention has relation to that kind of fence-posts consisting, essentially, of a metal stem and a burnt-clay or pottery base.

The improvements which I have devised will first be described by reference to the drawings, and will then be more specifically pointed out in the claims.

In the drawings accompanying this specification, Figures 1, 2, 3, 4, and 17 are longitudinal sections of various forms of posts and bases embodying my invention; Fig. 5, a longitudinal section of a post and base having devices for securing boards thereto. Figs. 6, 7, 8, and 9 are cross-sections of Figs. 1, 2, 3, 4, respectively, on the line $a\,a$, while Figs. 10, 11, 12, and 13 are cross-sections of the bases on the line $b\,b$. Fig. 14 is a cross-section of a removable fastening device on the line $c\,c$, Fig. 4, while Fig. 15 is an enlarged view thereof. Fig. 16 is a cross-section of Fig. 5 on the line $d\,d$.

The reference-numeral 1 in each figure indicates the top or exposed portion of a fence-post, the lower end being formed into a shank, 21, for entry into and securement within the base. In order to obtain strength and stiffness with a minimum of material, they are preferably constructed of angle-iron having three or more ribs. At the line of division between the shank and the upper or exposed portion of the post, which may be termed the "stem," the post is enlarged, so as to prevent the slipping up upon the post of the base beyond the desired point.

In Figs. 1, 2, 3, and 17 the parts are angle-iron—say cruciform in cross-section and straight, with the exception of the flange or boss 5, forming the enlargement referred to. In Figs. 1 and 17 the under side of this flange or boss is a plane surface, against which plates securing or protecting the bases are to take.

2 in each figure represents the burnt-clay base, preferably formed in sections, as shown in Figs. 1, 2, 3, 4, 5, and 17. In Fig. 1 this base is shown as made in two longitudinal sections, 3 3, each containing the half of an opening, 10, having a somewhat enlarged center, from whence extend radial wing-openings 11, gaged to fit snugly upon the wings of the angle-iron. These two sections are secured in position and prevented from lateral displacement by two flanged caps, 22 22, one at either end, the upper taking against the plane or under surface of the boss 5, the flanges of the caps extending and taking upon the sides of the sections for a space sufficient to firmly hold them. A fastening device, here shown as a wedge-key, 9, passing through a slot in the bottom of the shank, secures the parts firmly together, the base fitting the shank accurately and being reliably secured thereto without the use of cement.

In Figs. 2, 3, 4, 5, and 17 the base 2 is made of short transverse sections 4 4, more or less in number, as desired. Each section is provided with the opening 10, having enlarged center and the radial wing-openings 11 11, corresponding in each section in size and taper to the wings of the shank at the point the section is to occupy thereon, so as to provide for an accurate fitting of the complete base upon the shank. Different forms of the enlargement referred to for preventing the too great upward movement of the base and for aiding in causing the firm union of base and shank are shown. In Figs. 2, 3, and 5 the enlargement is the boss or projection 5, having its under side formed into a taper or bevel, 7. In Figs. 2 and 5 this taper or bevel is somewhat short, while in Fig. 3 it is much elongated comparatively, the upper sections, 4 4, being correspondingly reamed out. In Fig. 4, where tapering angle-iron is used, such enlargement is the point where the upwardly and outwardly incline or taper of the shank ends, the shank tapering through its entire length, the wing-apertures in the base being made to correspond thereto. The action of proper fastening devices, 9 9, applied to the end of the shank—as, for instance, wedge-keys or nuts, as shown—forces together the inner incline or surface of the openings in sections of the base and the taper or bevel of the boss or of the shank with a wedge or inclined plane action, securing a firm and tight joint.

In some instances, where the post or fence is quite heavy, the strain of the posts directly upon the base might be too great. In such cases the boss or flange 5 is formed, as in Fig. 17, with a plane under surface. A plate, 28, is used, having a central aperture the size of the shank, around which aperture is placed a flange or several dependent projections, 29, having a plane surface next the opening, but beveled or tapered upon the other surface. At its edge this plate may be provided with dependent teeth 30, to take into cavities formed in the upper section. Such a plate distributes the strain over the entire surface and prevents any crushing action upon the section. A somewhat similar plate, 31, having exterior teeth or projections, 32, may be used upon the bottom for the fastening device to act upon.

In order to give greater foundation-surface and lessen the danger from frost, &c., of upheaval or disalignment, the bottom section of the base may be made larger than the others, as shown in Fig. 4; or each section may be larger than the one next above it, or they may be inclined or tapered, as shown in dotted lines in Fig. 3.

In Figs. 11, 12, 13, and 16 the bases are shown as cruciform in cross-section. This form is advantageous in giving the maximum of strength and bearing-surface jointly with the minimum of material, the strain occurring in the lines of the wings, where there is the greatest amount of material.

To attain economy in burning in the kiln, and to avoid danger of warping during the process of burning, the objects should be closely packed together, so as to fully fill the kiln and mutually support each other. This shape of the bases permits this, as the wings of one section may fit into the angles of the adjoining sections. In order, then, to provide for the easy and equal passage and dissemination of the heat through the mass during firing, the central aperture, 10, is somewhat enlarged, and recesses 27 are formed upon the outer surfaces of the wings, making the exterior in effect corrugated or fluted, as shown in Fig. 12, those recesses, when the sections are packed together, forming flues or passages throughout the mass. It is well to apply to the shanks a coating of paint, tar, asphaltum, or similar waterproofing material, or that they be galvanized to prevent their oxidation.

By the constructions thus far noted I am enabled to furnish a metal post and a sectional burnt-clay or pottery base which readily may be firmly secured together, fitting each other accurately from their very construction without the use of cement, yet easily detachable for convenience of transportation. While I have used the term "fence-post" herein, it is evident that the use of the invention is not limited to fence-posts, but is of utility wherever it is desired to furnish a base for a metal upright or support for other purposes.

Some means are desirable to enable the posts to be readily used as the supports for wire strands or wooden panels. To accomplish the first of these objects apertures may be made in the flat side of the stem of a T post, as shown in Fig. 4, through which the ends of loops 12 are passed. Apertures are made in the ends of these loops, and an inclined nail or wedge-key, 13, being forced therethrough, the loop will be drawn inward, holding the wire strand 25 firmly in position to and against the post 1. Instead of 12 being made as a loop with two limbs or ends for the nail or wedge to pass through, it may be made as a hook, the upper limb terminating at a point—say, 26—near the face of the post.

I do not here claim the above-described wire-fastening device consisting of the metal fence-post stem, the loop with slotted legs, and the wedge-key. The same is made by me the subject of an application filed January 4, 1887, Serial No. 223,367. For the second of these objects the flat face of the stem of such a post may be roughened or formed into serrations 15, as in Fig. 5, a flat strip, 14, of the length and width of the body of the post being similarly roughened or serrated. If, now, the boards or strips for fence-panels be interposed between these two and drawn together by bolts and nuts or other equivalent fastening devices, 16, the serrations will bite or take into the body of the boards and hold them firmly in position. In this way these posts may be readily and economically used for fencing, which can be set up and taken down expeditiously and conveniently.

Having described my invention, what I claim, and desire to secure by Letters Patent, is as follows:

1. A base for a metallic fence-post made of burnt clay, cruciform in cross-section as to shape and having its exterior recessed, corrugated, or fluted, substantially as set forth.

2. The combination of a metallic fence-post composed of a stem and a shank, a sectional burnt-clay base fitting the shank, and means, substantially as described, for holding said sections together and in place upon said shank, substantially as hereinbefore set forth.

In testimony whereof I have hereunto set my hand this 5th day of November, 1885.

FRANK L. FAIRCHILD.

Witnesses:
M. J. ENZER,
D. C. ALLEN.